United States Patent [19]
Guise

[11] 3,989,458

[45] *Nov. 2, 1976

[54] COMPOSITIONS CONTAINING BISULPHITE ADDUCTS OF POLYISOCYANATES AND METHOD OF USE

[75] Inventor: Geoffrey Bruce Guise, Highton, Australia

[73] Assignee: Commonwealth Scientific and Industrial Research Organization, Australia

[ * ] Notice: The portion of the term of this patent subsequent to Aug. 5, 1992, has been disclaimed.

[22] Filed: Aug. 9, 1974

[21] Appl. No.: 496,189

[30] Foreign Application Priority Data

Aug. 15, 1973 Australia.............................. 4494/73

[52] U.S. Cl.................................... 8/192; 8/128 A; 8/DIG. 11; 260/29.2 TN; 260/29.6 NR; 260/77.5 R; 260/77.5 TB; 260/859 R
[51] Int. Cl.$^2$................. C08G 18/80; D06M 15/08; C08L 75/08
[58] Field of Search................ 260/77.5 R, 77.5 TB, 260/29.2 TN, 29.6 NR, 859; 8/192, DIG. 11

[56] References Cited
UNITED STATES PATENTS

| | | | |
|---|---|---|---|
| 2,710,816 | 6/1955 | Evans et al. | 8/192 |
| 2,746,988 | 5/1956 | Dozer | 260/77.5 TB |
| 2,786,734 | 3/1957 | Evans et al. | 8/192 |
| 2,893,898 | 7/1959 | Evans et al. | 8/192 |
| 3,152,920 | 10/1964 | Caldwell et al. | 117/138.8 |
| 3,238,010 | 3/1966 | Habib et al. | 8/192 |
| 3,438,940 | 4/1969 | Keberle et al. | 260/77.5 R |
| 3,491,051 | 1/1970 | Elkin et al. | 260/29.6 NR |
| 3,492,081 | 1/1970 | Morak | 8/192 |
| 3,519,478 | 7/1970 | Howell | 117/155 |
| 3,639,157 | 2/1972 | Wunder et al. | 117/139.5 A |
| 3,655,437 | 4/1972 | Becker et al. | 117/139.6 |

FOREIGN PATENTS OR APPLICATIONS

| | | | |
|---|---|---|---|
| 1,519,859 | 4/1968 | France | 260/77.5 TB |
| 1,131,006 | 10/1968 | United Kingdom | |

*Primary Examiner*—H.S. Cockeram
*Attorney, Agent, or Firm*—Dennis P. Clarke

[57] ABSTRACT

The addition of certain compounds — namely mineral acids, oxidising agents, materials capable of producing these acids and agents, or mixtures of the same — to BAPs or the corresponding mono-iso(thio)cyanate adducts renders these adducts more stable to storage and heat.

16 Claims, No Drawings

COMPOSITIONS CONTAINING BISULPHITE ADDUCTS OF POLYISOCYANATES AND METHOD OF USE

BACKGROUND OF THE INVENTION

1. Field of the Invention

The present invention relates to compositions containing bisulphite adducts of (poly)isocyanates or (poly)isothiocyanates (the poly-cyanates hereinafter being abbreviated to BAPs), with improved properties.

A BAP is defined as a compound containing two or more radicals drawn from type (I) and/or type (II) groups

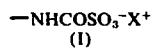  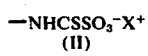

where $X^+$ is a cationic group with one or more positive charges to maintain electrical neutrality; for example, sodium, potassium or ammonium.

Similarly, adducts of the mono-isocyanates or monoisothiocyanates contain only one radical, drawn from (I) and/or (II). The BAPs, however, are preferred.

2. Description of the Prior Art

In copending U.S. Ser. No. 330,404 (Australian Application No. 52,234/73), methods were described for the preparation of BAPs by the reaction of polyisocyanates with aqueous solutions containing bisulphite salts and water-miscible organic solvents. Such compositions on prolonged storage (one year or more) at room temperature undergo slow decomposition, and this process was found to be hastened by heating.

SUMMARY

It has now been unexpectedly found that this decomposition can be retarded — thus providing compositions with improved shelf life, or compositions that can be stored at higher temperatures — by the addition to a composition containing at least one BAP (as defined above) of at least one of the following compounds
a. at least one mineral acid;
b. at least one material capable of producing, in aqueous solution, (a) mineral acid(s);
c. at least one oxidising agent;
d. at least one material capable of producing, in aqueous solution, (an) oxidising agent(s); or
e. a mixture of two or more of (a), (b), (c) and (d).

As suggested above, the invention extends to the mono-cyanates, and so the invention, in its broadest aspect, provides a composition comprising (1) at least one compound containing one or more radicals drawn from type (I) and/or type (II) groups

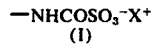  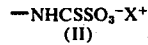

where $X^+$ is a cationic group with one or more positive charges to maintain electrical neutrality; and (2) at least one of the following compounds
a. at least one mineral acid;
b. at least one material capable of producing, in aqueous solution, (a) mineral acid(s);
c. at least one oxidising agent;
d. at least one material capable of producing, in aqueous solution, (an) oxidising agent(s); or
e. a mixture of two or more (a), (b), (c) and (d).

It is to be appreciated that compositions containing BAPs usually contain free bisulphite, for example as a result of the method of preparation set out in Australian Application No. 52,234/73, or on prolonged storage release bisulphite, for example by hydrolysis, and that such bisulphite salts would immediately react with an oxidising agent, if present, to produce the more acidic bisulphate salts. Thus additions of type (c) and (d) compounds produce a similar effect, namely acidification, to additions of type (a) or (b) compounds.

It might be expected that if bisulphite was removed from a composition containing a BAP it might hasten rather than retard BAP decomposition by promoting the reverse reaction to BAP formation, in an attempt to re-establish equilibrium by forming more bisulphite. In fact, the reverse was unexpectedly found.

DESCRIPTION OF THE PREFERRED EMBODIMENTS

As examples of mineral acids, there may be mentioned hydrochloric acid, sulphuric acid and phosphoric acid, which may be in concentrated form or diluted with water.

As examples of materials capable of releasing mineral acids in aqueous solution, there may be mentioned hydrogen chloride, sulphur trioxide, phosphorus pentoxide, sodium hydrogen sulphate, potassium hydrogen phosphate and ammonium hydrogen sulphate.

Other suitable acid releasing salts include sodium bisulphite, potassium bisulphite, sodium metabisulphite and potassium metabisulphite. These produce limited acidification, but if an oxidising agent is added at the same time or subsequently, a more pronounced acidification results.

As examples of oxidising agents, there may be mentioned hydrogen peroxide, chlorine, bromine, iodine, hypochlorous acid and hypochlorite salts.

In the compositions of the invention, it is preferable that 1 part of the additive, that is (a) and/or (b) and/or (c), be used to 50 to 1000 parts by BAP.

The compositions of the present invention are useful, after being subject to a curing operation, in the production of organic coatings, particularly for fibrous materials. In copending Australian Application No. 52,234/73, particular BAPs advantageous for the treatment of keratinous fibres to impart shrink resistance were described. However, on prolonged storage such compositions have been found to produce less effective shrink resistance. If such compositions are modified in accordance with the present invention, such loss of shrink-resist effectiveness on prolonged storage is prevented or minimized.

The compositions of the present invention may contain in addition to the previously mentioned compounds one or more of the following compounds
i. water;
ii. organic solvents;
iii. salts; or
iv. other polymeric materials.

When such compositions are used for the treatment of textile fibres, other textile agents known to those skilled in the textile art may be present; for example, dyes, pigments, flame retardants, setting agents, water repellants and fluorescent whitening agents.

Preferred examples of BAPs useful for the present invention, particularly for treating textile fibres, were listed in detail in copending Application No.

52,234/73, and include those with molecular weights from 250 to 10,000 with from 2 to 4 bisulphite adduct groups of structure (I) per molecule. Such BAPs most preferably have a backbone derived from one or more of the following monomers; propylene oxide, ethylene oxide, tetrahydrofuran, butadiene and caprolactone. BAPs of this type can be conveniently prepared from the reaction of polyisocyanates with bisulphite salts according to copending Application No. 52,234/73, such polyisocyanates being derived from polyols and aliphatic diisocyanates by prior art methods. Suitable polyols for such syntheses include polypropylene oxide polyols, polyoxy tetramethylene polyols, hydroxyl terminated polybutadienes and polycaprolactone polyols. The most preferred polyols are polypropylene oxide diol and triols of molecular weight 250 to 4,000. As preferred example of a polyisocyanate, there may be mentioned the commercial product Synthappret LKF (Bayer AG., Germany) which is considered to have a structure similar to (III)

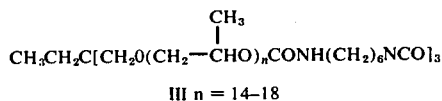

III n = 14–18

The following examples are provided to further illustrate the present invention, but are not to be construed as limiting the invention in any way.

EXAMPLE I a. Synthappret LKF (1 kg) was stirred vigorously whilst a solution of sodium metabisulphite (100 g) in water (500 ml) containing ethanol (1500 ml) was added. After several minutes the solution cleared and was infinitely dilutable with water. The antioxidant Plastanox 2246 (American Cyanamid (10 g) was added and dissolved by stirring to afford preparation A. This method is basically that described in copending Application No. 52,234/73.

b. To preparation A, 30% sulphuric acid solution (40 ml) was added, to give preparation B.

c. As an alternative to (b), 30% hydrogen peroxide solution (20 ml) was added to preparation A to yield preparation C. This addition caused the faint greenish colour of the preparation to be discharged.

TREATMENT OF WOOL FABRIC

Samples of the above solutions were diluted with water to give a 3% solution, adjusted to pH 7 with sodium bicarbonate, and padded onto samples of a plain weave wool worsted fabric (150 g/m²) at 100% pickup. These samples were dried at 100° C for 5 minutes, steamed for 30 seconds and then subjected to the following washing test.

WASHING TEST

Samples were washed for 1 hr in a 50 liter Cubex international machine with 12.5 l of wash liquor at 40° C containing 0.2 g/l $Na_2HPO_4$, 0.1 g $NaH_2PO_4$ and 0.5 g/l sodium dodecyl benzene sulphonate, using a total load of 1 kg made up with polyester weighting squares. Prior to washing samples were relaxed in a solution containing 0.05% $NaHCO_3$ and 0.5% soap for 20 minutes, measured, washed and measured again and the area shrinkage calculated. Under these conditions the untreated fabric shrank 70%.

RESULTS

Samples of BAP preparations A, B and C were stored in stoppered bottles for various times in constant temperature baths at ± 2° C then applied to wool fabric as above and the area shrinkage determined.

| Storage Conditions | | Area Shrinkage | | |
|---|---|---|---|---|
| Temp | Time | A | B | C |
| 20 | 1 week | 0 | 0 | 0 |
| 60 | 1 day | 1 | 0 | 0 |
| 60 | 1 week | 8 | 1 | 0 |
| 60 | 4 weeks | 68+ | 0* | 1* |
| 70 | 1 day | 5 | 1 | 0 |
| 70 | 4 days | 70+ | 2* | 5* |

Solutions marked * on dilution with water after storage were clear whilst those marked + were cloudy, or give a precipitate.

The above results demonstrate the improved properties of compositions B and C, which represent examples of the present invention.

EXAMPLE II

In the preparation as in A of Example I, sodium metabisulphite (80 g) was used. On completion of the reaction sodium metabisulphite (20 g) was added followed by 10% hydrogen peroxide (20 ml).

The preparation exhibited similar improved shelf life at high temperatures as did preparations B and C of Example I.

We claim:

1. A composition comprising (1) at least one bisulphite addition product of a polyisocyanate prepolymer or a polyisothiocyanate prepolymer, said addition product having an average at least two isocyanate-bisulphite or isothiocyanate-bisulphite adduct groups per molecule having no free isocyanate or isothiocyanate groups, and being freely water-soluble; said prepolymer being the water-insoluble reaction product of a polyisocyanate or polyisothiocyanate and a polyhydroxy compound; and (2) at least one of the compounds:
 a. at least one mineral acid;
 b. at least one material capable of releasing, in aqueous solution, (a) mineral acid(s);
 c. at least one oxidizing agent;
 d. at least one material capable of releasing, in aqueous solution, (an) oxidizing agent(s); or
 e. a mixture of two or more of (a), (b), (c) and (d).

2. A composition according to claim 1, wherein a mixture of (a) and (c) is present.

3. A composition according to claim 1, wherein (a) is selected from the group consisting of hydrochloric acid, sulphuric acid and phosphoric acid.

4. A composition according to claim 1, wherein (c) is hydrogen peroxide.

5. A composition according to claim 1, wherein (b) is selected from the group consisting of alkali metal bisulphates, bisulphites and metabisulphites, and ammonium bisulphate, bisulphite and metabisulphite.

6. A composition according to claim 5, wherein when the salt is a bisulphite or a metabisulphite (c) or (d) is also present.

7. A composition according to claim 6, wherein hydrogen peroxide is present.

8. A composition according to claim 1, wherein (1) is a bisulphite adduct of a polyisocyanate of molecular weight from 250 to 10,000 containing from 2 to 4 bisulphite adduct groups per molecule.

9. A composition according to claim 8, wherein the polyisocyanate is derived from a polyol and an aliphatic diisocyanate.

10. A composition according to claim 9, wherein the polyol is a polypropylene oxide diol or triol of molecular weight from 250 to 4000.

11. A composition according to claim 1, wherein (1) has the structure

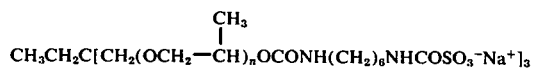

where n is from 1 to 40.

12. A composition according to claim 11, where n is from 14–18.

13. A process for the treatment of a fibrous material, comprising treating the material with a composition according to claim 1.

14. A process according to claim 13, wherein the composition is admixed with one or more other polymeric materials.

15. A process according to claim 14, wherein the other polymeric material is a polyacrylate in the form of an emulsion, dispersion or latex.

16. A textile material whenever treated by a process according to claim 13.